United States Patent
Bashar et al.

(10) Patent No.: US 9,839,049 B2
(45) Date of Patent: Dec. 5, 2017

(54) SCHEDULING FOR AN UNLICENSED CARRIER TYPE

(71) Applicant: INTEL IP CORPORATION, Santa Clara, CA (US)

(72) Inventors: Shafi Bashar, Santa Clara, CA (US); Hong He, Beijing (CN); Jong-Kae Fwu, Sunnyvale, CA (US); Seunghee Han, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 392 days.

(21) Appl. No.: 14/582,379

(22) Filed: Dec. 24, 2014

(65) Prior Publication Data

US 2015/0245376 A1 Aug. 27, 2015

Related U.S. Application Data

(60) Provisional application No. 61/943,981, filed on Feb. 24, 2014.

(51) Int. Cl.
*H04W 72/12* (2009.01)
*H04L 1/18* (2006.01)
*H04L 5/14* (2006.01)

(52) U.S. Cl.
CPC ........... *H04W 72/1273* (2013.01); *H04L 1/18* (2013.01); *H04L 1/1861* (2013.01); *H04L 5/14* (2013.01); *H04W 72/1289* (2013.01)

(58) Field of Classification Search
CPC ........... H04L 1/18; H04L 1/1861; H04L 5/14; H04W 72/1289; H04W 72/1273
See application file for complete search history.

(56) References Cited

U.S. PATENT DOCUMENTS

| 9,288,742 B2 * | 3/2016 | Etemad ................. H04W 16/14 |
| 2011/0105050 A1 * | 5/2011 | Khandekar ............. H04L 5/001 |
| | | 455/68 |
| 2013/0194980 A1 * | 8/2013 | Yin ....................... H04L 1/1854 |
| | | 370/280 |

(Continued)

FOREIGN PATENT DOCUMENTS

WO    WO 2012/078565 A1    6/2012
WO    WO 2013/006006 A2    1/2013

(Continued)

OTHER PUBLICATIONS

3GPP TSG RAN WG1 Meeting #73; R1-132554; Potevio; Multi-subframe scheduling and cross-subframe scheduling; Fukuoka, Japan; May 20-24, 2013.

(Continued)

*Primary Examiner* — Redentor Pasia
(74) *Attorney, Agent, or Firm* — Thorpe North & Western

(57) ABSTRACT

Technology for performing downlink scheduling is disclosed. One or more subframes can be identified within a defined frame of a primary cell to perform cross-subframe scheduling for a secondary cell. The primary cell can be configured to communicate with a user equipment (UE) using a licensed band and the secondary cell can be configured to communicate with the UE using an unlicensed band. The cross-subframe scheduling can be performed for one or more downlink subframes of the secondary cell using the one or more subframes of the primary cell.

22 Claims, 17 Drawing Sheets

| Scenario | PCell | SCell | SCell Scheduling | SCell HARQ ACK/NACK timing in legacy carrier | |
|---|---|---|---|---|---|
| 1 | FDD | FDD | Self | Follow PCell | |
| 2 | FDD | TDD | Self | Follow PCell | |
| 3 | TDD | TDD | Self | SCell DL subset of PCell DL | Follow PCell |
| | | | | PCell DL subset of SCell DL | Follow SCell |
| | | | | Others | Follow Reference |
| 4 | TDD | FDD | Self | TBD | |
| 5 | FDD | FDD | Cross-carrier | Follow PCell | |
| 6 | FDD | TDD | Cross-carrier | TBD | |
| 7 | TDD | TDD | Cross-carrier | SCell DL subset of PCell DL | Follow PCell |
| | | | | PCell DL subset of SCell DL | Follow PCell |
| | | | | Others | Follow PCell |
| 8 | TDD | FDD | Cross-carrier | TBD | |

(56) References Cited

U.S. PATENT DOCUMENTS

| | | | | |
|---|---|---|---|---|
| 2014/0003356 | A1* | 1/2014 | Wang | H04W 72/1289 370/329 |
| 2014/0036889 | A1 | 2/2014 | Kim et al. | |
| 2014/0098774 | A1* | 4/2014 | Gao | H04L 5/001 370/329 |
| 2015/0131536 | A1* | 5/2015 | Kaur | H04L 5/001 370/329 |
| 2015/0163805 | A1* | 6/2015 | Cattoni | H04W 72/0453 370/329 |
| 2015/0189574 | A1* | 7/2015 | Ng | H04W 24/08 370/252 |

FOREIGN PATENT DOCUMENTS

| | | |
|---|---|---|
| WO | 2013066385 A1 | 5/2013 |
| WO | WO 2014/004156 A2 | 1/2014 |

OTHER PUBLICATIONS

3GPP TS 36.213; $3^{rd}$ Generation Partnership Project; Technical Specification Group Radio Access Network; Evolved Universal Terrestrial Radio Access (E-UTRA); Physical layer procedures (Release 12), V12.0.0 (Dec. 2013).

3GPP TSG RAN WG1 Meeting #75; R1-136009; Offline discussion on self-scheduling for TDD-FDD CA; San Francisco, USA, Nov. 11-15, 2013.

3GPP TSG-RAN WG1 #76; R1-140411; On support of TDD-FDD Carrier Aggregation; Prague, Czech Republic, Feb. 10-14, 2014.

3GPP TS 36.211; $3^{rd}$ Generation Partnership Project; Technical Specification Group Radio Access Network; Evolved Universal Terrestrial Radio Access (E-UTRA); Physical Channels and Modulation (Release 12); V12.0.0 (Dec. 2013).

International Search Report dated Apr. 13, 2015 for PCT/US2015/012383; Applicant Intel IP Corporation et al.

Extended European search report issued Aug. 29, 2017; for EP Application No. 15752442.2; filed Jan. 22, 2015; 10 pages.

Huawei, Hisilicon; "Performance analysis and standard impacts of downlink control signaling enhancements"; 3GPP TSG R1-132659; (May 20-24, 2013); 6 pages.; RAN WG1 Meeting #73, Fukuoka, Japan; Agenda 6.2.5.1.1.

NEC; "On support of DL and UL cross-carrier scheduling in TDD-FDD CA"; 3GPP TSG R1-135835; (Nov. 11-15, 2013); 7 pages.; RAN WG1 Meeting #75, San Francisco, USA; Agenda 6.2.3.1.

* cited by examiner

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 0 | 0, 1, 2, 3 | | | | 0 | 0, 1, 2, 3 | | | |
| 1 | 0 | 0, 1, 2 | | | 0 | 0 | 0, 1, 2 | | | |
| 2 | 0 | 0, 1 | | 0 | 0 | 0 | 0, 1 | | 0 | 0 |
| 3 | 0 | 0, 1, 2, 3 | | | | 0 | 0 | 0 | 0 | 0 |
| 4 | 0 | 0, 1, 2 | | | 0 | 0 | 0 | 0 | 0 | 0 |
| 5 | 0 | 0, 1 | | 0 | 0 | 0 | 0 | 0 | 0 | 0 |
| 6 | 0 | 0, 1, 2, 3 | | | | 0 | 0, 1, 2 | | | 0 |

FIG. 3

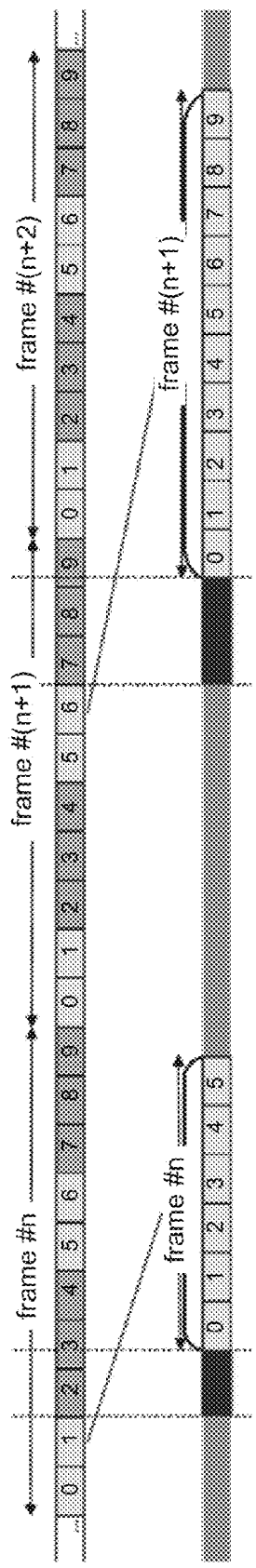
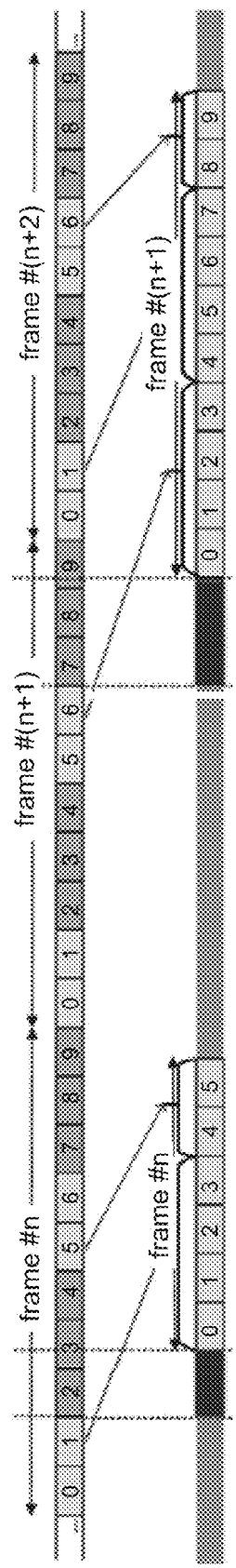
FIG. 7A
FIG. 7B

| Scenario | PCell | SCell | SCell Scheduling | SCell HARQ ACK/NACK timing in legacy carrier | |
|---|---|---|---|---|---|
| 1 | FDD | FDD | Self | Follow PCell | |
| 2 | FDD | TDD | Self | Follow PCell | |
| 3 | TDD | TDD | Self | SCell DL subset of PCell DL | Follow PCell |
| | | | | PCell DL subset of SCell DL | Follow SCell |
| | | | | Others | Follow Reference |
| 4 | TDD | FDD | Self | TBD | |
| 5 | FDD | FDD | Cross-carrier | Follow PCell | |
| 6 | FDD | TDD | Cross-carrier | TBD | |
| 7 | TDD | TDD | Cross-carrier | SCell DL subset of PCell DL | Follow PCell |
| | | | | PCell DL subset of SCell DL | Follow PCell |
| | | | | Others | Follow PCell |
| 8 | TDD | FDD | Cross-carrier | TBD | |

FIG. 8

| UL-DL Conf. | Subframe n | | | | | | | | | |
|---|---|---|---|---|---|---|---|---|---|---|
| | 0 | 1 | 2 | 3 | 4 | 5 | 6 | 7 | 8 | 9 |
| 0 – solution 1 | , | , | 6, [5] | [5], 4 | 4 | , | , | 6, [5] | [5], [4] | 4 |
| 0 – solution 2 | , | , | 6, [5], [4] | , | , | , | , | 6, [5], [4] | , | [5], 4 |
| 1 – solution 1 | , | , | 7, 6, [5] | [5], 4 | , | , | , | 7, 6, [5] | [5], 4 | , |
| 1 – solution 2 | , | , | 7, 6 | [6], [5], 4 | , | , | , | 7, 6 | [6], [5], 4 | , |
| 2 | , | , | 8, 7, 6, [5], 4 | , | , | , | , | 8, 7, 6, [5], 4 | , | , |
| 3 – solution 1 | , | , | 11, [10], [9], [8], 7, 6 | 6, 5 | 5, 4 | , | , | , | , | , |
| 3 – solution 2 | , | , | 11, [10], 7, 6 | [10], 6, 5 | [10], 5, 4 | , | , | , | , | , |
| 4 – solution 1 | , | , | 12, 11, [10], [9], 8, 7 | 7, 6, 5, 4 | , | , | , | , | , | , |
| 4 – solution 2 | , | , | 12, 11, [10], 8, 7 | [10], 7, 6, 5, 4 | , | , | , | , | , | , |
| 5 | , | , | 13, 12, 11, [10], 9, 8, 7, | , | , | , | , | , | , | , |
| 6 | , | , | 6, 5, 4 | 7, [6] | [6], 5 | , | , | 7 | 7, [6], [5] | , |

FIG. 10

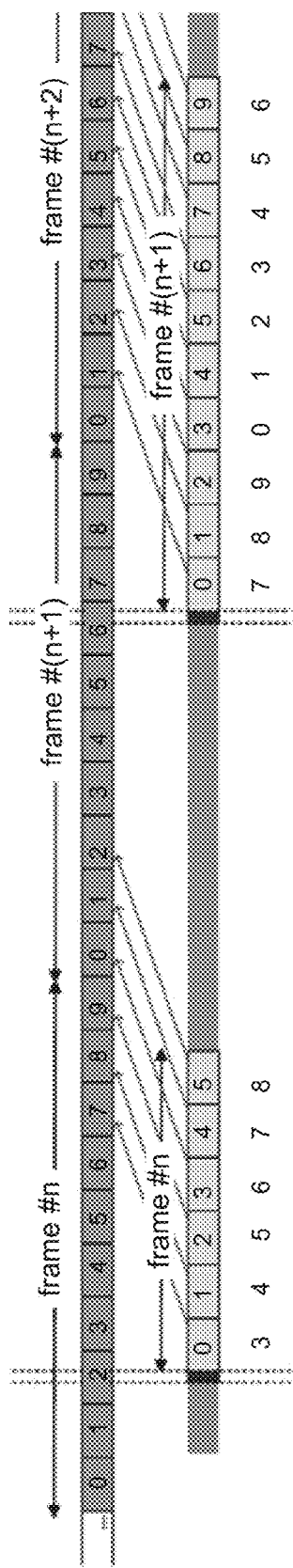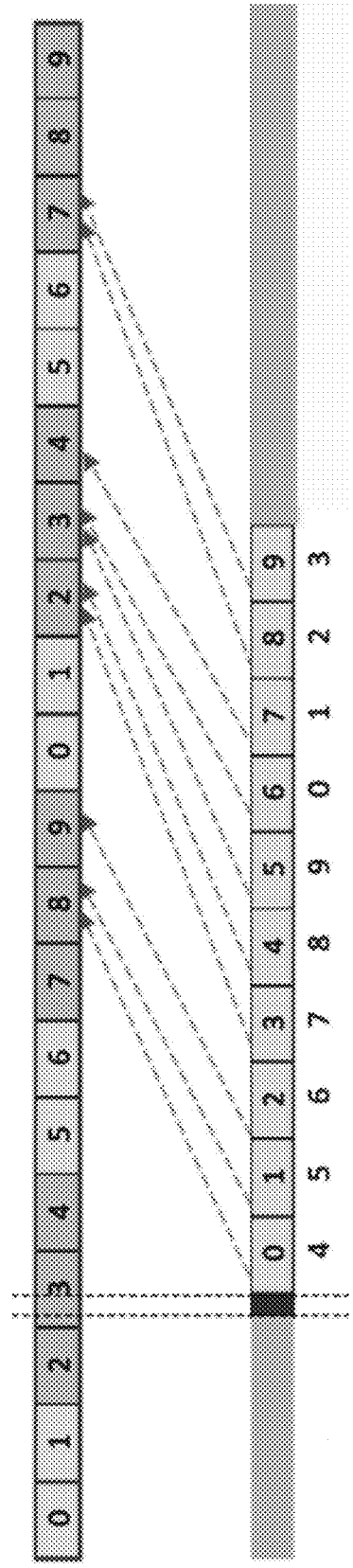
FIG. 11A
FIG. 11B

US 9,839,049 B2

SCHEDULING FOR AN UNLICENSED CARRIER TYPE

RELATED APPLICATIONS

The present application claims priority to U.S. Provisional Patent Application No. 61/943,981, filed Feb. 24, 2014, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 is a table with cross-subframe scheduling patterns based on a time division duplexing (TDD) uplink/downlink (UL/DL) configuration and a subframe number n in accordance with an example;

FIGS. 7A-7B illustrate multi-subframe scheduling for a secondary carrier (SCell) when subframe boundaries of the SCell are not aligned with subframe boundaries of a primary carrier (PCell) in accordance with an example;

FIG. 8 is a table with scenarios for secondary carrier (SCell) hybrid automatic repeat request (HARQ) acknowledgement (ACK)/negative acknowledgement (NACK) feedback corresponding to physical downlink shared channel (PDSCH) transmissions in accordance with an example;

FIG. 10 is a table for downlink (DL) hybrid automatic repeat request (HARQ) timings for a secondary carrier (SCell) operating in frequency division duplexing (FDD) and over a physical downlink shared channel (PDSCH) in accordance with an example;

FIGS. 11A-11B illustrate hybrid automatic repeat request (HARQ) feedback for a secondary carrier (SCell) when subframe boundaries of the SCell are not aligned with subframe boundaries of a primary carrier (PCell) in accordance with an example;

Figure 1A:
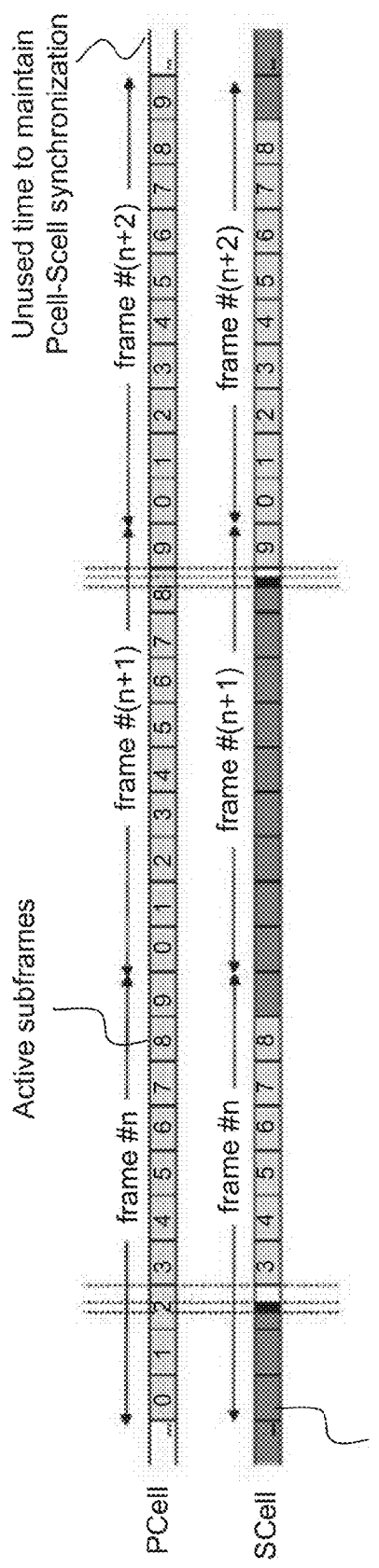
FIG. 1A illustrates a first type of unlicensed carrier type (UCT) secondary carrier having subframes boundaries that are aligned with those of a primary carrier in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for performing downlink scheduling for a secondary carrier (SCell) or secondary cell using subframes of a primary carrier (PCell) or primary cell. The secondary cell can also be referred to as an unlicensed carrier type (UCT). The primary cell can be configured to communicate with a user equipment (UE) using a licensed band and the secondary cell can be configured to communicate with the UE using an unlicensed band. The UE can communicate with both the primary cell and the secondary cell using carrier aggregation. In one example, an evolved node B (eNB) can perform the downlink scheduling for the secondary cell using subframes of the primary carrier (PCell) or primary cell. For example, the eNB can identify one or more subframes within a defined frame of the primary cell to perform cross-subframe scheduling for the secondary cell. The eNB can subsequently perform the cross-subframe scheduling for one or more downlink subframes of the secondary cell using the one or more subframes of the primary cell.

In one example, the subframes of the primary cell that are used to perform the cross-subframe carrier scheduling for the secondary cell can be downlink subframes and/or special subframes. The cross-carrier scheduling can be performed in accordance with a predefined cross-subframe scheduling pattern. For example, the cross-subframe scheduling can indicate specific subframes of the primary cell that are to be used for performing the cross-subframe scheduling. The predefined cross-subframe scheduling pattern can depend on whether the primary cell operates in time division duplexing (TDD) or frequency division duplexing (FDD), as well as whether the secondary cell operates in TDD or FDD.

In one configuration, the subframes of the primary cell can be aligned with the subframes of the secondary cell with respect to subframe boundaries and corresponding indexes. In an alternative configuration, the subframes of the primary cell are not aligned with the subframes of the secondary cell with respect to subframe boundaries and corresponding indexes. In one example, a single downlink control information (DCI) can be used to perform the cross-subframe scheduling for each downlink subframe of the secondary cell. In another example, a single downlink control information (DCI) can be used to perform the cross-subframe scheduling for a defined number of consecutive downlink subframes of the secondary cell (e.g., one DCI can be used for five consecutive downlink subframes of the secondary cell).

In one configuration, the eNB can receive hybrid automatic repeat request (HARQ) feedback from the one or more subframes of the secondary cell. The subframes of the secondary cell used for the HARQ feedback can correspond to one or more uplink subframes of the primary cell based on a predefined HARQ feedback pattern. In one example, a subframe of the secondary cell can have a transmission direction that is different than a transmission direction of a corresponding subframe of the primary cell. In this example, the HARQ feedback from the subframe of the secondary cell can be transmitted using an alternative subframe of the primary cell.

As demand for wireless broadband data has increased in recent years, cellular operators are considering whether to use unlicensed spectrum in order to augment their service offering. In order to utilize the unlicensed spectrum in Long Term Evolution Advanced (LTE-A), "LTE in Unlicensed" or LTE-U is being considered for adoption into the 3GPP LTE standard. LTE-U can also be referred to a licensed assisted access (LAA). LTE-U proposes to extend the LTE platform into unlicensed deployments, thus enabling operators and vendors to leverage existing or planned investments in LTE and evolved packet core (EPC) hardware in the radio and core network. By bringing LTE Advanced to unlicensed spectrum, operators can better utilize the unlicensed 5 GHz band (or other unlicensed bands). As a result, operators can augment existing network capacity and offer an enhanced user experience.

In one example, LTE-U can be considered a Supplemental Downlink or a Component Carrier (CC) in a LTE Carrier Aggregation (CA) configuration. The use of LTE in unlicensed band necessitates co-existence of LTE with other incumbent technologies in that band. For example, LTE-U can be designed to operate in the unlicensed spectrum, such that LTE-U does not conflict with Wi-Fi used within the same unlicensed spectrum. Due to multiple LTE operators using the same unlicensed spectrum, self-coexistence among different LTE operators in the same band is essential for maintaining high network performance and the enhanced user experience.

The current technology describes a novel carrier type that is to operate as a supplemental secondary carrier (SCell) in the unlicensed band. The novel carrier type can be referred to as an Unlicensed Carrier Type (UCT). The terms "UCT," "secondary cell," and "secondary carrier" can be used interchangeably herein. Alternatively, the novel carrier type can be referred to as an unlicensed secondary cell. In other words, the secondary carrier (SCell) or secondary cell can operate in the unlicensed band. A user equipment (UE) can be connected to the secondary cell operating in the unlicensed band. In addition, the UE can be connected to a primary cell (PCell) or primary carrier that operates using a licensed band. The UE can be connected to both the primary cell and the secondary cell in a carrier aggregation scenario. Carrier aggregation between the licensed band and the unlicensed band can provide increased data rates, thereby providing the UE with an enhanced experience.

The operation of secondary cell (or UCT) on the unlicensed band can be categorized into two states: dormant state and active state. The UCT subframes during the dormant states can be referred to as dormant subframes, whereas the subframes during active states can be referred to as active subframes. Depending on whether the UCT maintains subframe/frame boundary alignment with the primary cell (PCell) or not, the UCT can be categorized into two types: Type 1 and Type 2. The UCT is Type 1 when a subframe boundary between the UCT SCell and the PCell are aligned. The UCT is Type 2 when the subframe boundary between the UCT SCell and the PCell are not aligned.

FIG. 1A illustrates a first type of unlicensed carrier type (Type 1 UCT) secondary carrier (SCell) having subframes boundaries that are aligned with those of a primary carrier (PCell). As shown in FIG. 1A, the SCell UCT subframes (both dormant subframes and active subframes) are aligned with the PCell legacy carrier type (LCT) subframes at the subframe boundary. For example, active subframe #4 in frame #n of the primary cell can be substantially aligned with active subframe #4 in frame #n of the secondary cell (or UCT). The UCT during the dormant state can perform listen before talk (LBT) and a channel reservation mechanism in order to reserve the medium for LTE-U transmissions. The number of subframes reserved for the active state can depend on the traffic load of the LTE-U and the availability of spectrum.

Figure 1B:
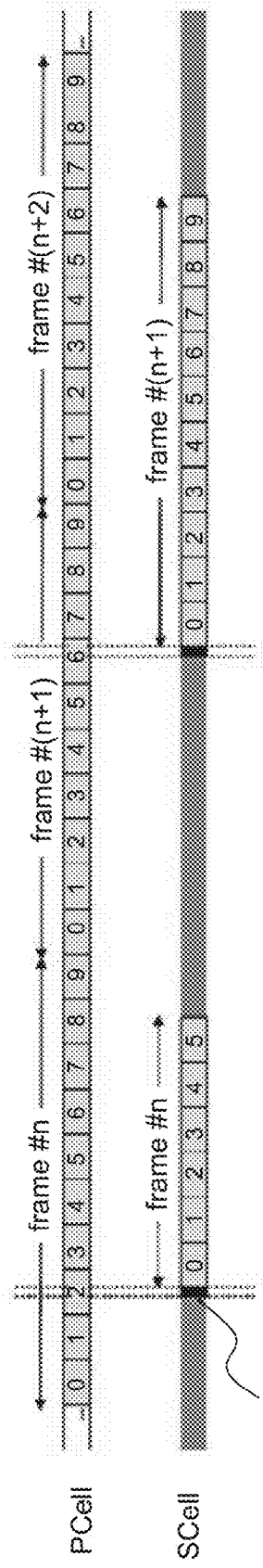
FIG. 1B illustrates a second type of unlicensed carrier type (UCT) secondary carrier having subframes boundaries that are not aligned with those of a primary carrier in accordance with an example.

FIG. 1B illustrates a second type of unlicensed carrier type (Type 2 UCT) secondary carrier (SCell) having subframes boundaries that are not aligned with those of a primary carrier (PCell). As shown in FIG. 1B, the SCell UCT subframes (both dormant subframes and active subframes) are not are aligned with the PCell legacy carrier type (LCT) subframes at the subframe boundary. For example, active subframe #6 in frame #n of the primary cell is not aligned with subframe #3 or subframe #4 in frame #n of the secondary cell (or UCT). In other words, for Type 2 UCT, the frame/subframe boundary and the corresponding indexes in the Type 2 UCT are not aligned with that of the primary cell (PCell).

Novel downlink scheduling assignment mechanisms for the UCT SCell and corresponding HARQ ACK/NACK feedback transmission mechanisms are described herein. In one example, the UCT can serve as a supplemental secondary carrier (SCell) in a carrier aggregation (CA) scenario, wherein the UE is also connected to a licensed primary carrier (PCell). The current technology is also applicable in dual connectivity (DC) scenarios, when the UCT acts as a SCell to the PCell in a Master eNB (MeNB) group. Similarly, the current technology is applicable when the UCT acts as a SCell to a sPCell in a secondary eNB (SeNB) group. The sPCell is one of the SCells within the SeNB, which is used for transmission of HARQ ACK/NACK feedback. In addition, the technology described herein is related to Type 2 UCTs, where the UCT acts as the sPCell and the PCell in the MeNB group.

Downlink (DL) scheduling for the UCT can be performed using two techniques: PCell Cross-carrier scheduling and SCell self-scheduling. Thus, the UCT active subframe can be self-scheduled or cross-carrier scheduled using the licensed PCell. Since the UCT can be primarily used as a supplemental downlink carrier, reliable reception of the control channel in the UCT cannot be guaranteed due to the usage of other incumbent radio access technologies (RATs) in the unlicensed band. Therefore, novel approaches described herein can ensure reliable reception of control information (e.g., scheduling information, HARQ ACK/NACT feedback etc.).

In one example, DL scheduling information for the UCT can be transmitted using PCell cross-carrier scheduling. In the legacy carrier, cross-carrier scheduling can be primarily used for inter-cell interference coordination, where by using cross-carrier scheduling, heavy interference on the downlink (DL) control channel can be avoided. Examples of the downlink control channel can include the physical downlink control channel (PDCCH) or the physical hybrid-ARQ indicator channel (PHICH). Such interference can arise in heterogeneous network deployments, in which a UE may be located within a range expansion zone for improved small cell offloading, but can suffer from heavy interference from the macro cell. With respect to the UCT, reliable reception of the DL/UL control channel in the unlicensed SCell cannot be guaranteed. Instead of using self-scheduling through UCT physical downlink control channel (PDCCH) or enhanced PDCCH (EPDCCH), the licensed PCell can be used for scheduling active UCT subframes through cross-carrier scheduling.

In another example, DL scheduling information for the UCT can be transmitted using SCell self-scheduling. In order to improve the reliability of the control channel (PDCCH/EPDCCH) reception on the UCT, additional improvements can be introduced to the legacy self-scheduling mechanism. Such improvements can be achieved by use of lower modulation and coding schemes. In self-scheduling, the SCell itself can ensure reliable reception of the control channel (as opposed to the PCell), such that the SCell (or UCT) does not conflict with other RATS using the unlicensed band, The licensed PCell can operate using time division duplexing (TDD) or frequency division duplexing (FDD). In addition, the unlicensed SCell can operate using TDD or FDD. Depending on the duplexing schemes (i.e., FDD or TDD) of the licensed PCell and the unlicensed SCell, a total of four scenarios can be identified for cross-carrier scheduling of the UCT SCell:

| Scenario | PCell LCT | SCell UCT (cross-carrier scheduled) |
|---|---|---|
| 1 | FDD | FDD |
| 2 | FDD | TDD |
| 3 | TDD | TDD |
| 4 | TDD | FDD |

For scenarios 1 and 2, in which the PCell operates using FDD, legacy mechanisms can be reused, i.e., the PDCCH or EPDCCH in the PCell in subframe n can provide the scheduling information for the SCell in subframe n.

On the other hand, for scenarios 4 and 4, the legacy mechanisms have limited capabilities. In scenario 3, a SCell TDD DL subframe cannot be cross-carrier scheduled if the corresponding PCell TDD subframe is UL. Similarly, in scenario 4, if subframe n in the PCell is UL, then the corresponding DL subframe in the SCell cannot be cross-carrier scheduled using the PCell. In order to resolve this issue, the current technology describes two novel mechanisms: a first mechanism involves cross-subframe scheduling for the PDSCH, and the second mechanism involves multi-subframe scheduling for the PDSCH. In one example, the two novel mechanisms proposed to improve scenarios 3 and 4 can also be readily applicable to scenarios 1 and 2. In addition, the two novel mechanisms can be applicable to both the Type 1 UCT (i.e., where subframes are aligned) and the Type 2 UCT (i.e., where subframes are not aligned).

In one example, cross-subframe scheduling can be performed for the UCT in the PDSCH. Since the number of PCell DL subframes can be less than the number of SCell DL subframes, several SCell DL subframes can be cross-carrier scheduled from a single PCell DL subframe. Multiple downlink control information (DCI) can be used to carry out the scheduling information for multiple SCell DL subframes from a single PCell DL subframe. In other words, each downlink subframe of the secondary cell can be scheduled using a single DCI (i.e., a one-to-one-ratio between the number of DCI and the number of scheduled downlink subframes of the secondary cell). It can be desirable to minimize the number of subframes in between the PDCCH/EPDCCH transmission and the PDSCH transmission. In one example, if there are multiple DCI from a single PCell subframe, then multiple SCell subframes can be scheduled using the multiple DCI, wherein the multiple SCell subframes may or may not have the same subframe index as the PCell subframe index.

Figure 2A:
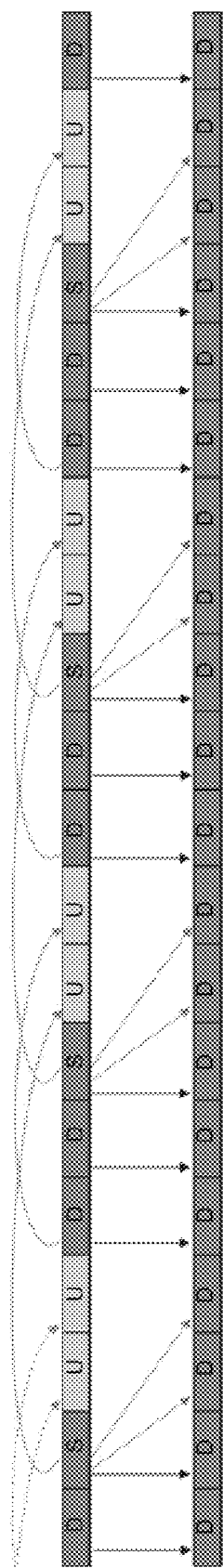
FIG. 2A illustrates cross-subframe scheduling when a primary carrier (PCell) operates using time division duplexing (TDD) and a secondary carrier (SCell) operates using frequency division duplexing (FDD) in accordance with an example.

FIG. 2A illustrates exemplary cross-subframe scheduling when a primary carrier (PCell) operates using time division duplexing (TDD) and a secondary carrier (SCell) operates using frequency division duplexing (FDD). The PDCCH in the Downlink Pilot Time Slot (DwPTS) of the special subframe is used to carry the scheduling information of the subsequent SCell DL subframes, whose corresponding PCell subframes are UL. As shown in FIG. 2A, the first subframe of the primary cell can perform intra-subframe scheduling for the first subframe of the secondary cell. However, the second subframe of the primary cell (i.e., the special subframe) can perform both intra-subframe scheduling for the second subframe of the secondary cell and cross-subframe scheduling for the fourth subframe of the secondary cell. The fourth subframe of the secondary cell (i.e., the downlink subframe) is in the opposite transmission direction as compared to the corresponding fourth subframe of the primary cell (i.e., the uplink subframe). For each frame (i.e., ten subframes), the cross-subframe scheduling for the secondary cell can be similarly repeated.

Figure 2B:
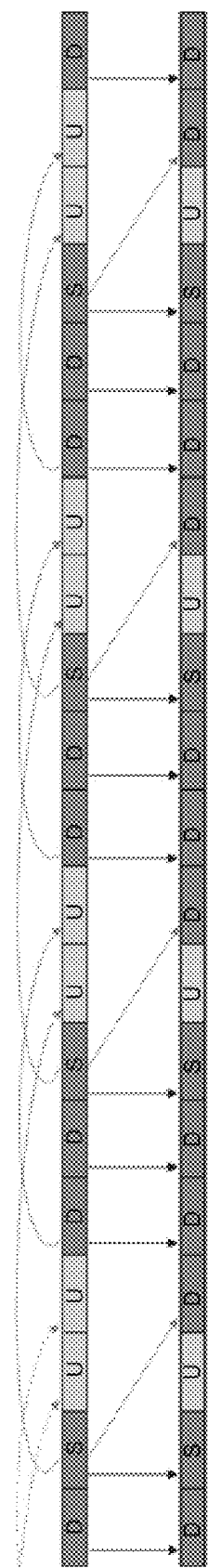
FIG. 2B illustrates cross-subframe scheduling when a primary carrier (PCell) operates using time division duplexing (TDD) and a secondary carrier (SCell) operates using TDD in accordance with an example.

FIG. 2B illustrates exemplary cross-subframe scheduling when a primary carrier (PCell) operates using time division duplexing (TDD) and a secondary carrier (SCell) operates using TDD. Similarly, the PDCCH in the DwPTS of the special subframe is used to carry the scheduling information of the subsequent SCell DL subframes, whose corresponding PCell subframes are UL. In this configuration, the secondary cell can include uplink subframes, for which cross-carrier scheduling is not performed. For example, the third subframe of the secondary cell (i.e., the uplink subframe) is not scheduled using the primary cell.

FIG. 3 is a table with cross-subframe scheduling patterns based on a time division duplexing (TDD) uplink/downlink (UL/DL) configuration and a subframe number n. For a PCell with a defined TDD UL/DL configuration (e.g., 0-6) and normal HARQ operation, the UE can upon detection of a PDCCH/EPDCCH with downlink DCI format in subframe n intended for the UE, adjust the corresponding PDSCH transmission in subframe n+k for the SCell, wherein k is given in the table. For example, when the primary cell is in TDD UL/DL configuration 0, intra-subframe scheduling can be performed using the first subframe of the primary cell when n is equal to 0 and k is equal to 0. In other words, the first subframe of the primary cell can be used to perform intra-subframe scheduling on the first subframe of the primary cell. When n is equal to 1, the second subframe of the primary cell can be used to perform intra-subframe scheduling on the second subframe of the secondary cell. In addition, the second subframe of the primary cell can be used to perform cross-subframe scheduling on the third subframe of the secondary cell, the fourth subframe of the secondary cell, and/or the fifth subframe of the secondary cell. The second subframe of the primary cell can potentially be used to perform scheduling (both intra-subframe and cross-subframe) because k is equal to 0, 1, 2 and 3 when n is equal to 1 (and the subframe n+k indicates the subframe on the secondary cell for which cross-subframe scheduling is performed).

In the configuration described above, two subframes are used for cross-subframe scheduling, while the remaining subframes perform intra-subframe scheduling. For example, as shown in FIGS. 2A-2B, the second subframe of the primary cell and the seventh subframe of the primary cell (i.e., both special subframes) can be used to perform the cross-subframe scheduling for multiple downlink subframes of the secondary cell. While this technique has the advantage of simplifying the scheduling configuration, an uneven DCI traffic load can be encountered among different subframes. In order to balance out the DCI traffic load among different subframes, multi-subframe scheduling configurations can be spread out among different subframes.

Figure 4A:
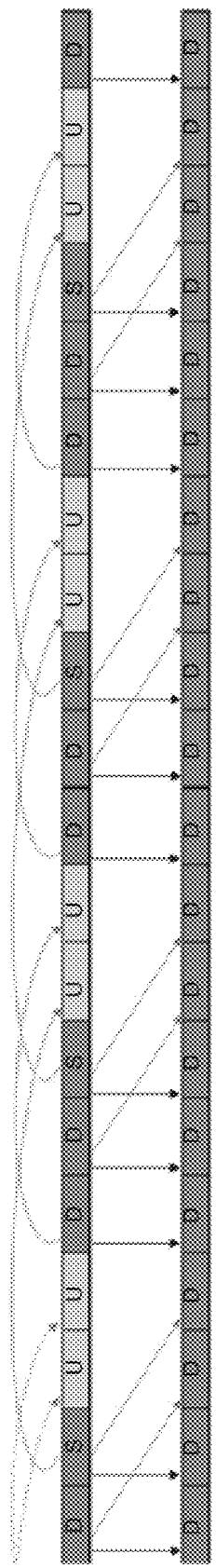
FIGS. 4A-4B illustrate cross-subframe scheduling for a secondary carrier (SCell) using downlink subframes of a primary carrier (PCell) and special subframes of the PCell in accordance with an example.
Figure 4B:
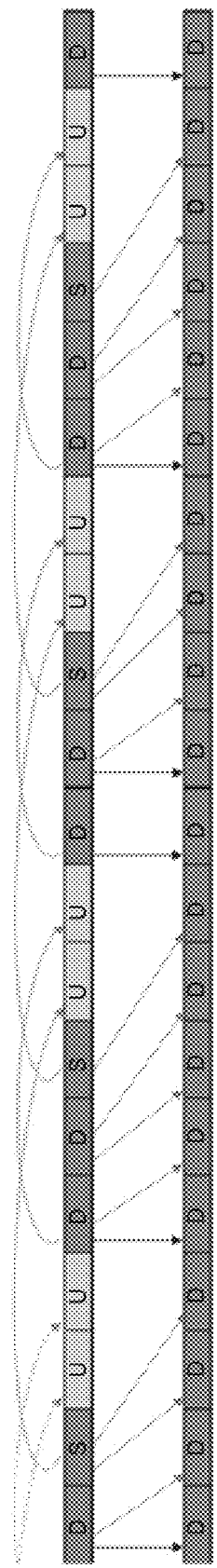

FIGS. 4A-4B illustrate exemplary cross-subframe scheduling for a secondary carrier (SCell) using downlink subframes of a primary carrier (PCell) and/or special subframes of the PCell. The intra-subframe scheduling configurations can be similar to the legacy configurations. However, the cross-subframe scheduling configurations can be spread out among multiple subframes. The downlink subframes of the primary cell can perform intra-subframe scheduling and/or cross-subframe scheduling for subframes of the secondary cell, and the special subframes of the primary cell can perform intra-subframe scheduling and/or cross-subframe scheduling for subframes of the secondary cell. As a result, sequential scheduling of subframes can be advantageously provided in this solution. The uplink subframes of the primary cell are not used to perform scheduling for the secondary cell.

In the example shown in FIG. 4A, the first subframe of the primary cell (i.e., a downlink subframe) can be used to perform intra-subframe scheduling for the first subframe of the secondary cell and cross-carrier scheduling for the third subframe of the secondary cell. In addition, the second subframe of the primary cell (i.e., a special subframe) can be used to perform intra-subframe scheduling for the second subframe of the secondary cell and cross-carrier scheduling for the fourth subframe of the secondary cell. Each downlink subframe of the secondary cell can be scheduled using intra-frame scheduling of cross-subframe scheduling.

In one example, in order to reflect these changes (i.e., using both downlink subframes and special subframes of the primary cell) for different UL/DL TDD configurations, additional tables (similar to the table in FIG. 2) can be added to the 3GPP LTE specification.

In one configuration, a multi-subframe scheduling scheme can also be adopted for the UCT as an alternative to cross-subframe scheduling. In this configuration, a single DCI can indicate scheduling for multiple subframes of the secondary cell. In the scenarios for cross-subframe scheduling described above, scheduling for each cross-subframe can be performed using separate DCI. However, in this configuration, one DCI can be used to schedule multiple subframes of the secondary cell when cross-subframe scheduling is performed for the secondary cell. This approach can be referred to as multi-subframe scheduling because multiple subframes of the secondary cell can be scheduled simultaneously.

Based on availability of the unlicensed band, the eNB can offload traffic of the UE to the secondary cell (or UCT). Even when an unlicensed spectrum is available, the unlicensed spectrum may only be available to a few UEs depending on the traffic load and the interference characteristics. Therefore, traffic can be offloaded for a particular UE by allocating multiple subframes at once.

Figure 5:
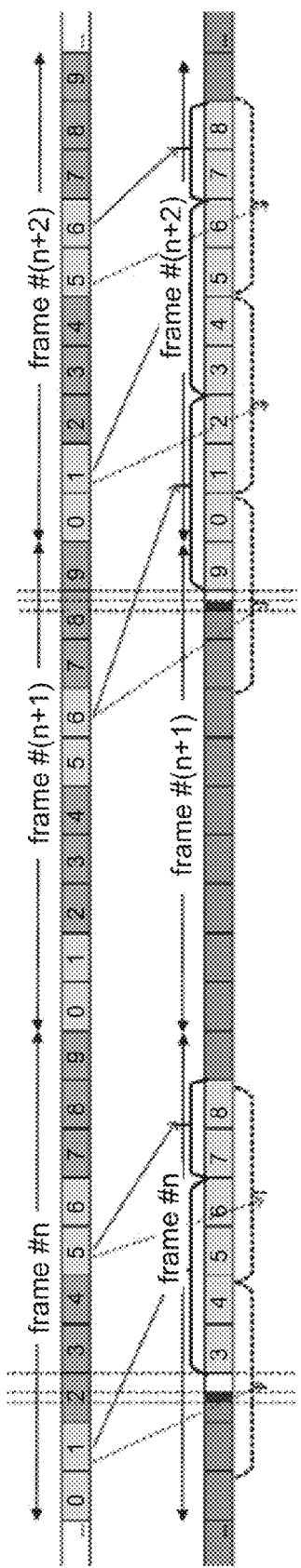
FIG. 5 illustrates multi-subframe scheduling for a secondary carrier (SCell) in accordance with an example.

FIG. 5 illustrates exemplary multi-subframe scheduling for a secondary carrier (SCell). By using multi-subframe scheduling, a set of N subframes can be scheduled, wherein N is an integer. As a non-limiting example, N can be set to four consecutive subframes. In other words, a single subframe of the primary cell can be used to perform multi-subframe scheduling for four consecutive subframes of the secondary cell. In one configuration, N can be configured dynamically or semi-statically configured. In another configuration, rather than consecutive subframes of the secondary cell being scheduled, additional diversity gain can be achieved by introducing time interleaving, e.g., scheduling can be performed at every other subframe, every other slots, etc. of the secondary cell. Additional frequency diversity can be achieved by introducing frequency interleaving among different subframes and/or slots.

As shown in FIG. 5, the multi-subframe scheduling can be performed according to a certain starting position. In one example, the subframe scheduling can be performed in advance, and the starting position of the first subframe scheduling can start from the first active UCT subframe (as shown by the solid lines in FIG. 5). In an alternative example, the starting position of the subsequent scheduling can start where the previous scheduling stops (as shown by the dashed lines in FIG. 5). In the latter example, the starting position of the multi-subframe scheduling can start from the same subframe regardless of whether the subframe is active or dormant.

In one configuration, cross-subframe scheduling can be performed when the UCT is Type 2 (i.e., the subframes of the UCT are not aligned with the subframes of the primary cell). In order to facilitate the cross-subframe scheduling for Type 2 UCT, a parallel subframe can be used. The parallel subframe of an active Type 2 UCT subframe with a starting and finishing time instance of $t_1$ and $t_2$, respectively, is the corresponding PCell subframe with a starting and finishing time instance of $t_3$ and $t_4$, respectively, such that $t_3 <= t_1$ and $t_1 <= t_4 <= t_2$.

For Type 2 UCT, an SCell subframe can be scheduled by either a parallel PCell subframe or by a PCell subframe that is located before the parallel subframe by using cross-carrier, cross-subframe, or multi-subframe scheduling. For cross-carrier scheduling, if a DCI is from a parallel PCell subframe, then the secondary subframe can be scheduled. For cross-subframe scheduling, if multiple DCI are from a single PCell subframe, then multiple SCell subframes can be scheduled with the restriction that the scheduling subframe (PCell) can be either the parallel subframe of the scheduled subframe (SCell) or is located before the parallel subframe. For multi-subframe scheduling, if a single DCI is from a single PCell subframe, then multiple SCell subframes can be scheduled with the restriction that the scheduling subframe (PCell) can be either the parallel subframe of the scheduled subframe (SCell) or is located before the parallel subframe. In one example, the parallel subframe is a one-to-one concept between a PCell subframe and a SCell subframe.

Figure 6A:
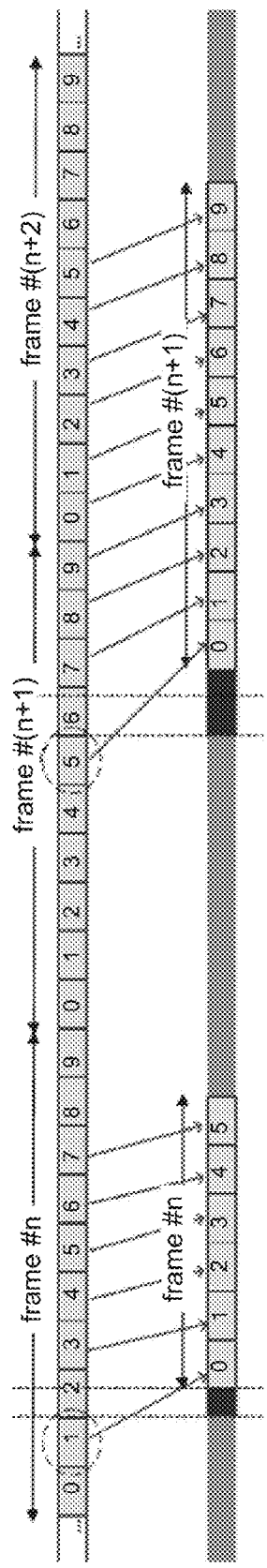
FIGS. 6A-6C illustrate cross-subframe scheduling for a secondary carrier (SCell) when subframe boundaries of the SCell are not aligned with subframe boundaries of a primary carrier (PCell) in accordance with an example.
Figure 6B:
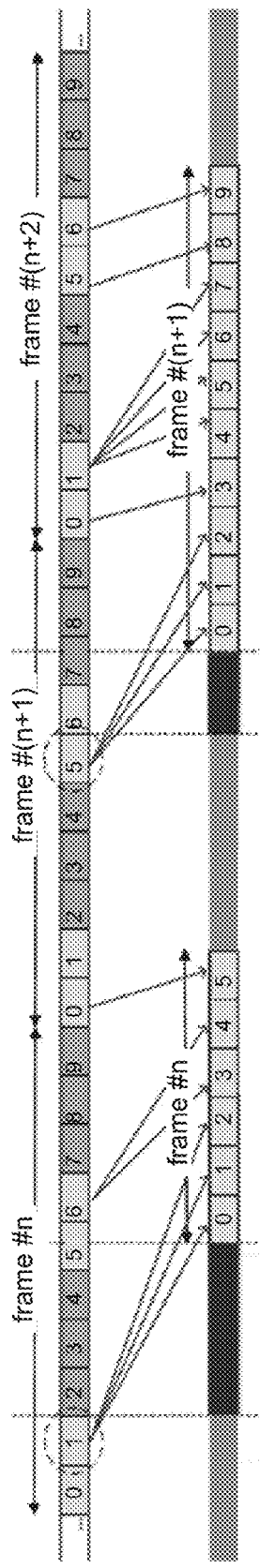
Figure 6C:
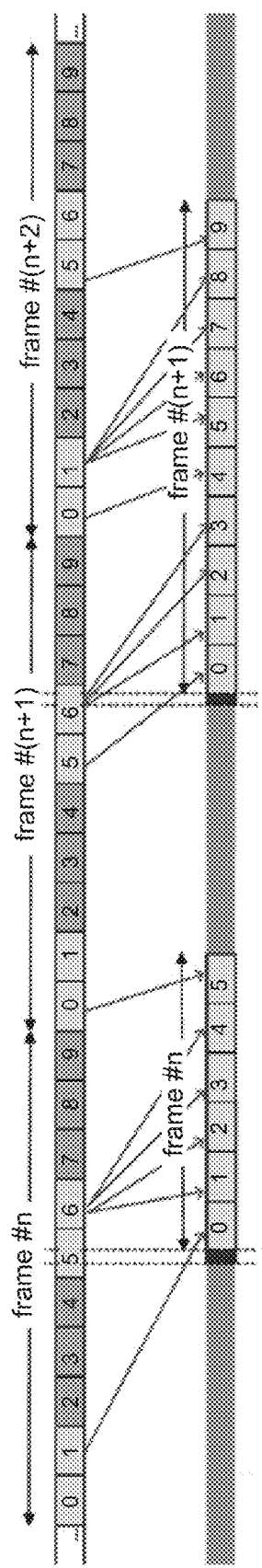

FIGS. 6A-6C illustrates cross-subframe scheduling for a secondary carrier (SCell) when subframe boundaries of the SCell are not aligned with subframe boundaries of a primary carrier (PCell). In other words, the secondary cell (or UCT) can be unsynchronized with the primary cell. In FIG. 6A, the primary cell operates in FDD. The first active subframe in the UCT frame can be scheduled in advanced before the UCT reserves the medium. In other words, subframe #1 in frame #n of the primary cell can be used to schedule (in advance) subframe #0 in frame #n of the secondary cell. Once the UE receives the scheduling information of the first subframe, the UE will start performing LBT operation and channel reservation mechanism to reserve the medium on the UCT SCell. Subsequent scheduling can be performed once the medium is reserved. The scheduling of subframes other than the first subframe in the UCT frame is cross-carrier scheduled by the parallel PCell subframe. For example, subframe #5 in frame #n of the primary cell can be used to schedule subframe #3 in frame #n of the secondary cell subframe #5 and subframe #3 are parallel subframes according to the definition described above.

In FIG. 6B, the primary cell can operate in TDD and the secondary cell can operate in FDD in a carrier aggregation (CA) scenario. In this example, additional cross-subframe scheduling can be used. For example, the first three active subframes in the UCT frame can be scheduled in advance before the UCT reserve the medium. The first three subframes can be scheduled together due to the uncertainty in reserving the unlicensed medium. If the UE starts the LBT operation and channel reservation mechanism after receiving the initial scheduling information, the subsequent scheduling may not be possible in some UCT subframes if the corresponding PCell subframe is UL. By scheduling three subframes in advance, such a situation can be avoided.

In the examples shown in FIGS. 6A and 6B, the UE can start performing LBT operations and the channel reservation mechanism after receiving the initial scheduling information. However, LBT and channel reservation mechanism can start in any other time instances depending on a network load, a NAV table in the eNB, intelligent sensing, etc.

In FIG. 6C, the primary cell operates in TDD. In this example, the rules defined in the table in FIG. 2 can be reused with a slight modification for parallel subframes. In this example, one subframe of the secondary cell can be scheduled in advance. For example, subframe #1 in frame #n of the primary cell can be used to perform scheduling for subframe #0 in frame #n of the secondary cell, and subframe #6 in frame #n of the primary cell can be used to perform scheduling for subframes #1-5 in frame #n of the secondary cell FIGS. 7A-7B illustrate multi-subframe scheduling for a secondary carrier (SCell) when subframe boundaries of the SCell are not aligned with subframe boundaries of a primary carrier (PCell). In other words, multi-subframe scheduling can be performed for Type 2 UCT. In FIG. 7A, all active subframes in the UCT frame can be scheduled using a single DCI. In addition, all active subframes in the UCT frame can be scheduled simultaneously. As shown in FIG. 7A, subframe #1 in frame #n of the primary cell can be used to perform scheduling for all subframes in frame #n (using a single DCI).

In FIG. 7B, a defined group of active subframes in the UCT frame can be scheduled using a single DCI. The defined group of active subframes can be indicated by a value k, wherein k is an integer. In addition, all k active subframes in the UCT frame can be scheduled simultaneously. The value of k can be indicated in a DCI field in the control information, or alternatively, the value of k can be defined semi-statically. As shown in FIG. 7B, subframe #1 in frame #n of the primary cell can be used to perform scheduling for k subframes in frame #n, wherein k is equal to four. In addition, a single DCI can be used to perform the scheduling.

In one configuration, a subframe indicator field can be used to indicate which subframe is scheduled using cross-subframe scheduling. In one example, the subframe indicator field can be implemented by reinterpreting a legacy DCI format field. For example, a 3-bit carrier indicator field (CIF) can be implemented to indicate the DL subframes on the UCT SCell for which the DCI are intended for. In another example, an additional 2-bit long subframe indicator field can be introduced in the DL DCI formats (e.g., 1, 1a, 1b, 1c, 2, 2a, 2b, 2c, 2d). When a maximum of 4 subframes can be used for cross-subframe scheduling, a 2-bit field is sufficient. If the DCI field on subframe n contains the subframe indicator field, then the DCI is intended to schedule subframe n+k of SCell, wherein k is indicated by the subframe indicator field. Since only a few subframes are allowed for cross-subframe scheduling in certain scenarios, the introduction of the additional field in the DCI field can increase the number of blind decoding only in a few subframes (e.g., 2 subframes out of 10 subframes).

In previous versions of the 3GPP LTE standard, type 1 UCT and cross-carrier scheduling is supported in the standard, whereas cross-subframe and multi-subframe scheduling are not supported in the standard. In previous implementations of cross-carrier scheduling, a PCell subframe (e.g., with index 2) can only schedule a SCell subframe with the same index (e.g., index 2).

In one configuration, a subframe indicator field can be used to indicate which subframe is scheduled for multi-subframe scheduling. In one example, the subframe indicator field can be implemented by reinterpreting a legacy DCI format field. For example, a 3-bit carrier indicator field (CIF) can be implemented to indicate the DL subframes on the UCT SCell for which the DCI are intended for. In another example, the subframe indicator field can be used by adding a novel k-bit field onto a fixed position (e.g., at the start or end) of the legacy DCI (Downlink Control Information) formats, wherein k is the number of DL subframes that can be scheduled in one DCI format. Starting from most significant bit (MSB) to least significant bit (LSB), the bitmap can correspond to different DL subframes within the multi-subframes scheduling window. In one example, the bit "1" can indicate the corresponding subframe within the scheduling window was scheduled, and the bit "0" can indicate that the corresponding subframe within the scheduling window was not scheduled.

In one configuration, k=4 (as shown in FIG. 7B) and a bitmap of "0101" indicates that the eNB intends to schedule subframe #1 and #3 simultaneously with one shared DCI format. The scheduling window size (k) can be either predefined or configured by higher-layer signaling in an UE-specific manner. This solution can be applicable to both Type 1 UCT and Type 2 UCT.

The additional higher layer signaling can be semi-statically defined, as opposed to using the DCI. The higher layer signal can define the corresponding cross-subframe index for cross-subframe scheduling. A scheduling subframe pattern can be specified. For example, DCI transmitted on subframe "n" can be used to indicated "k" consecutive downlink subframes on the UCT SCell starting from subframe n, i.e., from subframe "n" to subframe "n+k−1". The starting subframe index can be alternatively configured by higher layers to be a subframe that is later than subframe 'n'. When the UE receives the DCI in subframe n for the SCell UCT, the UE can decode the corresponding PDSCH in the DL subframe within the intended scheduling window.

In one example, the UCT can perform listen-before-talk (LBT) and channel reservation mechanisms to reserve the unlicensed medium for a particular duration, i.e. the number of active subframe in a UCT frame. The number of reserved subframes can depends on regulatory restriction, UE traffic load, channel condition, incumbent RAT traffic, etc. The number of active subframe reserved during a UCT frame can be indicated using the DCI associated with the initial scheduling in the UCT frame. When the UE receives this information, the UE can use LBT and the channel reservation mechanism to reserve the channel for the indicated durations. Alternatively, this can be semi-statically scheduled.

In one example, HARQ ACK/NACK feedback mechanisms can be applied for the UCT SCell. Since the UCT is primarily used as a secondary carrier, the HARQ ACK/NACK feedback corresponding to the DL data transmission on the UCT active subframe can be in the UL carrier associated with PCell. The HARQ ACK/NACK feedback mechanisms described herein can be applicable to both Type 1 UCT and Type 2 UCT.

FIG. 8 is a table with scenarios for secondary carrier (SCell) hybrid automatic repeat request (HARQ) acknowledgement (ACK)/negative acknowledgement (NACK) feedback corresponding to physical downlink shared channel (PDSCH) transmissions. The SCell HARQ ACK/NACK feedback corresponding to the PDSCH transmission can be categorized into eight scenarios. The primary cell (PCell) can operate using FDD or TDD. The secondary cell (SCell) can also operate using FDD or TDD. Depending on the scenario, the secondary cell can be scheduled using self-scheduling or cross-carrier scheduling. In addition, the legacy timing mechanism for each of the eight scenarios is presented in the table shown in FIG. 8.

In scenarios 1, 2, 5 and 6, i.e. when associated PCell is FDD, two timing mechanisms can be considered to transmit the SCell HARQ feedback. In a first timing mechanism, the SCell HARQ feedback can follow the PCell HARQ timing. In a second timing mechanism, the SCell HARQ feedback can follow the SCell HARQ timing.

With respect to an FDD carrier, the HARQ ACK/NACK feedback received on subframe n can be associated with the PDSCH transmission on subframe n−4. With respect to a TDD carrier, the HARQ ACK/NACK feedback received on subframe n can be associated with the PDSCH transmission on subframe n−k, where the value of k is given in Table 10.1.3.1-1 of 3GPP Technical Specification (TS) 36.213 Release 12.0.0.

If the first timing mechanism is used for the UCT feedback transmission, then for scenarios 1, 2, 5 and 6, the HARQ ACK/NACK transmission associated with a UCT active subframe index n−4 can be transmitted on a PCell UL subframe index n. The first timing mechanism can be used for scenarios 1 and 2 in the legacy carrier. On the other hand, if the second timing mechanism is used, then in scenarios 1, 2, 5 and 6, the HARQ ACK/NACK transmission associated with a FDD UCT active subframe index n−4 or a TDD UCT subframe index n−k can be transmitted on a PCell UL subframe index n, where k is given in Table 10.1.3.1-1 of 3GPP Technical Specification (TS) 36.213 Release 12.0.0.

In scenarios 3, 4, 7 and 8 (i.e., when the PCell associated with the UCT is TDD), several scenarios can arise. In a first scenario, the SCell DL subframes can be a subset of the PCell DL subframes. In a second scenario, the PCell DL subframes can be a subset of the SCell DL subframes.

With respect to the first scenario (i.e., when the SCell DL subframes are a subset of the PCell DL subframes), this situation can occur in scenario 3 and 7 (i.e., when both the PCell and the SCell operate in TDD). The DL subframes in the SCell UL/DL configurations can be a subset of the DL subframes in the PCell UL/DL configurations, as further described in 3GPP LTE 36.213 Release 12.0.0, Table 10.2-1, Set 1. In this example, the first mechanism described above (i.e., when the SCell HARQ feedback follows the PCell HARQ timing), can be used for HARQ ACK/NACK transmission in the legacy case. A similar approach can be used for the UCT HARQ ACK/NACK feedback.

With respect to the second scenario (i.e., when the PCell DL subframes are a subset of the SCell DL subframes), this situation can occur when the SCell operates in FDD, i.e., scenario 4 and 8. This situation can also occur in scenario 3 and 7 where the DL subframes in the PCell UL/DL configurations are a subset of the DL subframes in the SCell UL/DL configuration, as further described in 3GPP LTE 36.213 Release 12.0.0, Table 10.2-1, Sets 2 and 4).

When scenario 3 occurs (i.e., when both the PCell and the SCell operate in TDD), the SCell can perform self-scheduling by following its own HARQ timing according to a system information block type 1 (SIB1) configuration if an enhanced Interference Mitigation & Traffic Adaptation (eIMTA) feature is not enabled on the UCT SCell, or a higher-layer configured DL-reference configuration when eIMTA-feature is enabled on the UCT SCell. A similar approach can be adapted to the UCT SCell.

In previous releases of the 3GPP LTE standard (e.g., Release 11 with inter-band TDD CA), the SCell can follow the PCell configuration for HARQ feedback when both the PCell and the SCell operate in TDD (i.e., when scenario 7 occurs). However, this technique is not readily applicable to the UCT SCell. In the legacy cross-carrier scheduling technique, only the overlapped DL subframes between the PCell and the SCell could be cross-scheduled. However, with the cross-subframe scheduling technique for LTE-U described in the current technology, all of the DL subframes intend to be scheduled in order to maximize the peak data rate of an LTE-U enabled UE (i.e., a UE configured to use LTE-U). Therefore, a novel HARQ ACK/NACK timing for the "conflicting subframes" is described herein. The "conflicting subframe" can be a subframe in which a transmission direction on the UCT SCell is different than its corresponding subframe on the LCT PCell. A technique for appropriate defining the HARQ timing in order to resolve conflicting subframes on the UCT is described below.

Figure 9A:
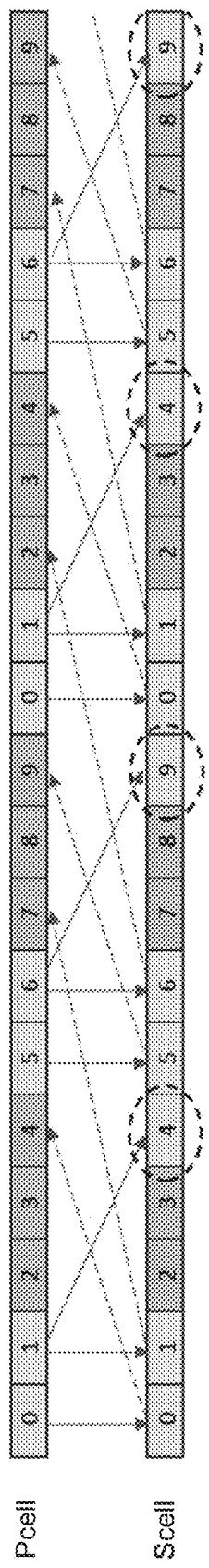
FIGS. 9A-9D illustrate hybrid automatic repeat request (HARQ) feedback for a secondary carrier (SCell) in accordance with an example.

FIG. 9A illustrates exemplary hybrid automatic repeat request (HARQ) feedback for a secondary carrier (SCell). FIG. 9A illustrates HARQ feedback issues for conflicting subframes of the UCT. As shown in FIG. 9A, cross-carrier PDSCH scheduling can be performed using the first subframe of the primary cell, the second subframe of the primary cell, the sixth subframe of the primary cell, the seventh subframe of the primary cell, and so on. HARQ ACK/NACK feedback can occur from the secondary cell using uplink subframes of the primary cell. For example, the first subframe of the secondary cell can perform the HARQ ACK/NACK feedback using the fifth subframe of the primary cell, and the second subframe of the secondary cell can perform the HARQ ACK/NACK feedback using the sixth subframe of the primary cell. The first and second subframes for both the primary cell and the secondary cell are in the same transmission direction (i.e., downlink subframes). However, the fifth subframe of the secondary cell is not in the same transmission direction as the corresponding fifth subframe of the primary cell. In this example, the fifth subframe of the primary cell is in the uplink direction and the fifth subframe of the secondary cell is in the downlink direction. As a result, subframe #4 (i.e., the fifth subframe) of the secondary cell belongs to a conflicting subframe and cannot transmit the HARQ ACK/NACK feedback. Similarly, subframe #9 (i.e., the tenth subframe) of the secondary cell also belongs to a conflicting subframe.

Several mechanisms can be utilized to solve the problem above. In one example, instead of using the PCell configuration, the SCell can follow its own HARQ ACK/NACK timing (similar to the self-scheduling case in scenario 3). In another example, the SCell can follow the PCell timing by multiplexing/bundling the ACK/NACKs from several DL subframes. In yet another example, the SCell can follow the PCell timing configuration for the DL subframes that can be cross-carrier scheduled using the legacy cross-carrier scheduling technique. For other DL subframes (i.e., conflicting subframes), a novel timing can be introduced for the HARQ-ACK feedback.

In one example, scenario 7 can be considered as a special case of scenario 8 (i.e., when the PCell operates using TDD and the SCell operates using FDD) by considering the DL subframes of TDD SCell as a subset of the DL subframes of the FDD SCell. Therefore, solutions proposed for scenario 8 can be reused scenarios by treating the SCell TDD configurations as a special case of FDD.

Figure 9B:
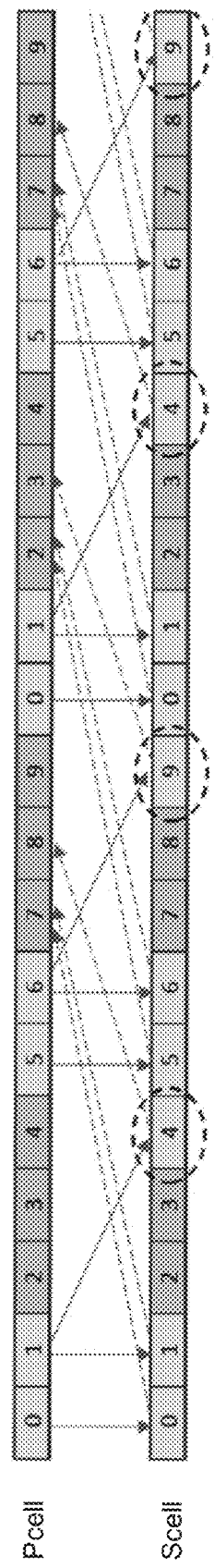

FIG. 9B illustrates exemplary hybrid automatic repeat request (HARQ) feedback for a secondary carrier (SCell). In this example, the SCell HARQ feedback can follow a SCell reference timing. As shown in FIG. 9B, the first and second subframes of the secondary cell can provide HARQ feedback using the eight subframe (i.e., subframe #7) of the primary cell. As a result, the fourth subframe of the secondary cell can use the eight subframe (i.e., subframe #8) of the primary cell in order to provide the HARQ feedback. Therefore, even though the fourth subframe of the secondary cell is a conflicting subframe (i.e., the transmission direction is different than that of the fourth subframe of the primary cell), the fourth subframe of the secondary cell can still provide the HARQ feedback.

Figure 9C:
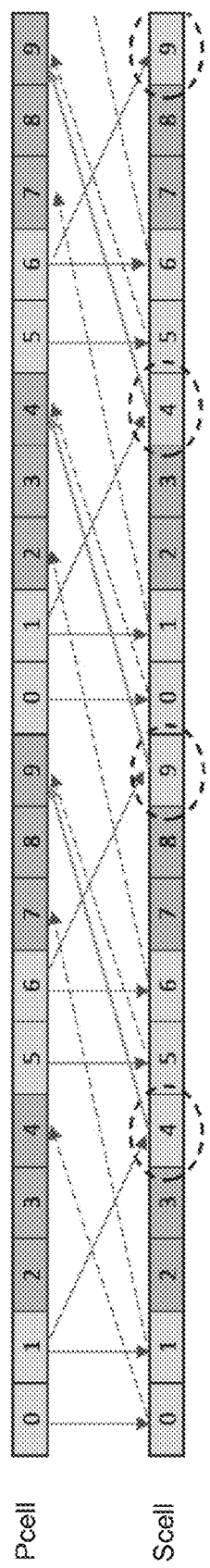

FIG. 9C illustrates exemplary hybrid automatic repeat request (HARQ) feedback for a secondary carrier (SCell). In this example, the SCell HARQ feedback can follow the PCell timing by multiplexing/bundling ACK/NACK from several DL subframes. As shown in FIG. 9C, both the fifth and sixth subframes of the secondary cell (i.e., subframe #4 and subframe #5, respectively) can provide HARQ feedback using the tenth subframe (i.e., subframe #9) of the primary cell. Subframe #4 of the secondary cell reporting the HARQ feedback using subframe #9 of the primary cell is an additional novel timing. Therefore, even though the fourth subframe of the secondary cell is a conflicting subframe, the fourth subframe of the secondary cell can still provide the HARQ feedback.

Figure 9D:
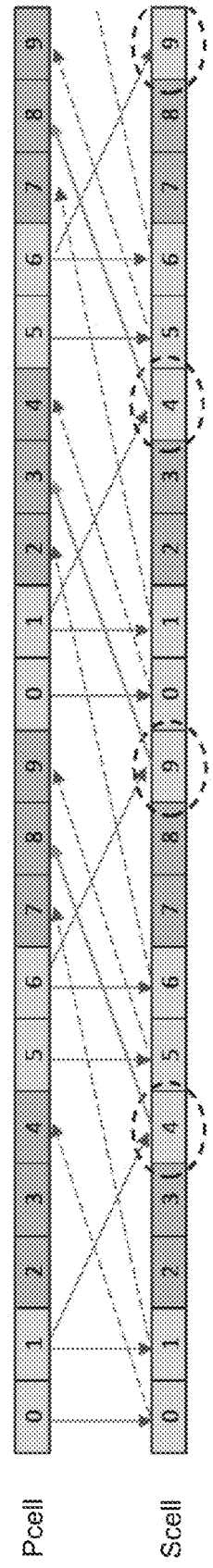

FIG. 9D illustrates exemplary hybrid automatic repeat request (HARQ) feedback for a secondary carrier (SCell). In this example, the SCell HARQ feedback can follow the PCell reference timing for existing subframes and a novel timing mechanism for remaining subframes. As shown in FIG. 9D, the first subframe (i.e., subframe #0) of the secondary cell can use the fifth subframe (i.e., subframe #4) of the primary cell for the HARQ feedback, the second subframe (i.e., subframe #1) of the secondary cell can use the eight subframe (i.e., subframe #7) of the primary cell for the HARQ feedback, the fifth subframe (i.e., subframe #4) of the secondary cell can use the ninth subframe (i.e., subframe #8) of the primary cell for the HARQ feedback, and the sixth subframe (i.e., subframe #5) of the secondary cell can use the tenth subframe (i.e., subframe #9) of the primary cell for the HARQ feedback. Subframe #4 of the secondary cell reporting the HARQ feedback using subframe #8 of the primary cell is an additional novel timing. Therefore, even though the fourth subframe of the secondary cell is a conflicting subframe, the fourth subframe of the secondary cell can still provide the HARQ feedback.

The issue of HARQ ACK/NACK feedback timing with the TDD PCell and the FDD SCell (scenarios 4 and 8) with respect to the UCT can be mitigated using several solutions. In one example, the SCell can follow the TDD PCell timing. An additional novel timing can be introduced for the remaining subframes of the FDD SCell.

FIG. 10 is a table for downlink (DL) hybrid automatic repeat request (HARQ) timings for a secondary carrier (SCell) operating in frequency division duplexing (FDD) and over a physical downlink shared channel (PDSCH). The exemplary DL HARQ timings, as shown in the table in FIG. 10, can be for FDD SCell PDSCH in a TDD-FDD carrier aggregation (CA) scenario. In other words, the PCell can operate using TDD and the SCell can operate using FDD. Potential solutions corresponding to different UL/DL configurations are shown in the table in FIG. 10. In the table, novel entries marked with brackets are added to ensure that all DL subframes on the FDD SCell can be reached.

In one example, the SCell HARQ feedback can follow a DL reference TDD UL/DL configuration, for which several examples are described herein. In a first example, the DL reference TDD UL/DL configuration can be fixed as configuration 5, as this configuration has a greatest number of DL subframes and is able to feedback 9 out of 10 subframes. In a second example, the DL reference TDD UL/DL configuration can be fixed depending on the TDD PCell UL/DL configuration. In a third example, the DL reference TDD UL/DL configuration can be configured by higher layers. For SCell DL subframes that cannot be addressed using the reference TDD UL/DL configurations, novel multiplexing/bundling of the ACK/NACK can be utilized.

In one configuration, neither the SCell DL subframes being a subset of the PCell DL subframes, nor the PCell DL subframes being a subset of the SCell DL subframes, can be applicable for scenario 3 and 7. This situation relates to set 3 and 5 in 3GPP LTE TS 36.213 Release 12.0.0 Table 10.2-1. When scenario 3 occurs, the existing mechanisms can be readily applicable. When scenario 7 occurs (i.e. cross-carrier scheduling), the existing mechanism cannot schedule all DL subframes. However, by cross-subframe scheduling, all subframes can be scheduled. Therefore, an additional timing mechanism can be used to address the HARQ feedback of the SCell DL subframes. Several solutions are described to address the above problem. In one example, instead of using the PCell timing configuration, the SCell can follow the timing corresponding to set 3 in Table 10.2-1 of 3GPP LTE TS 36.213, as opposed to set 5 as described above. In another example, the SCell can follow the PCell timing by multiplexing/bundling ACK/NACKs from several DL subframes. In yet another example, the SCell can follow the PCell timing configuration for the DL subframes that can be cross-carrier scheduled using the legacy technique. For other DL subframes, a novel timing can be added. In another example, the SCell can follow novel reference timing configurations.

In one example, scenario 7 can be considered as a special case of scenario 8 (i.e., TDD-FDD) by considering DL subframes of the TDD SCell as a subset of DL subframes of the FDD SCell. Therefore, solutions described for scenario 8 can be reused scenarios by treating the SCell TDD configurations as a special case of FDD. In the case of UCT, if only active DL subframes in a frame are considered, then a first timing mechanism (as described above) can be applied for the HARQ ACK/NACK transmissions.

With respect to Type 2 UCT, various solutions for performing the HARQ ACK/NACK feedback are described depending on whether the primary cell and secondary cell operate in FDD or TDD. As described in further detail below, in a first scenario, the PCell can operate in FDD and the SCell can operate in FDD or TDD. In a second scenario, the PCell can operate in TDD and the SCell can operate in FDD. In the third scenario, the PCell can operate in TDD and the SCell can operate in TDD.

FIG. 11A illustrates exemplary hybrid automatic repeat request (HARQ) feedback for a secondary carrier (SCell) when subframe boundaries of the SCell are not aligned with subframe boundaries of a primary carrier (PCell). In this example, the PCell operates in FDD and the SCell operates in FDD or TDD. When the PCell operates in FDD, the UCT HARQ feedback can follow the PCell timing. In the legacy carrier, the HARQ ACK/NACK received on PCell UL subframe n can correspond to the PDSCH transmission on SCell subframe n−4. Since the subframe index in Type 2 UCT differs from the PCell subframe indexing, a modified subframe indexing can be introduced for Type 2 UCT for HARQ ACK/NACK feedback purposes. With respect to Type 2 UCT, there are no one-to-one correspondence between the PCell subframe and the SCell subframe. Therefore, parallel subframes can be used as described above. Since a minimum time duration of 4 ms (i.e. 4 subframes) is generally needed for a UE to process the PDSCH reception and generate HARQ ACK/NACK feedback, for the Type 2 UCT, the modified subframe index for HARQ feedback purposes can be defined as the parallel PCell subframe index plus one. As an example, if the subframe index of UCT is 0, and the corresponding parallel subframe index at the PCell is 2, then the modified subframe index of the UCT for HARQ ACK/NACK feedback purposes is 2+1=3.

FIG. 11B illustrates exemplary hybrid automatic repeat request (HARQ) feedback for a secondary carrier (SCell) when subframe boundaries of the SCell are not aligned with subframe boundaries of a primary carrier (PCell). In this example, the PCell operates in TDD and the SCell operates in FDD. In addition, modified subframe indexing can be applied for HARQ ACK/NACK feedback purposes, as discussed earlier. In this example, the SCell can follow an UL/DL configuration 0 for the HARQ timing.

In one example, the PCell can operate in TDD and the SCell can operate in TDD. When a Type 2 TDD UCT attempts to perform HARQ feedback with a licensed TDD PCell, previous mechanisms cannot be readily applicable. Even with modified subframe indexing, due to shifting of subframes, the PCell and SCell configurations cannot match the sets of Table 10.2-1 of 3GPP LTE TS 36.213 Release 12.0.0. Since previous timing configurations cannot be applied, several techniques are described herein. In one example, the TDD UCT can be considered as a special case of the FDD UCT, wherein the DL subframes in the TDD UCT is a subset of the DL subframes in the FDD UCT. In this example, the modified subframe indexing can be used for FDD with FDD timing mechanisms. In another example, novel timing mechanisms can be introduced for each shift scenario. This technique has the advantage of providing additional loading of HARQ feedback among different PCell UL subframes.

Figure 12:
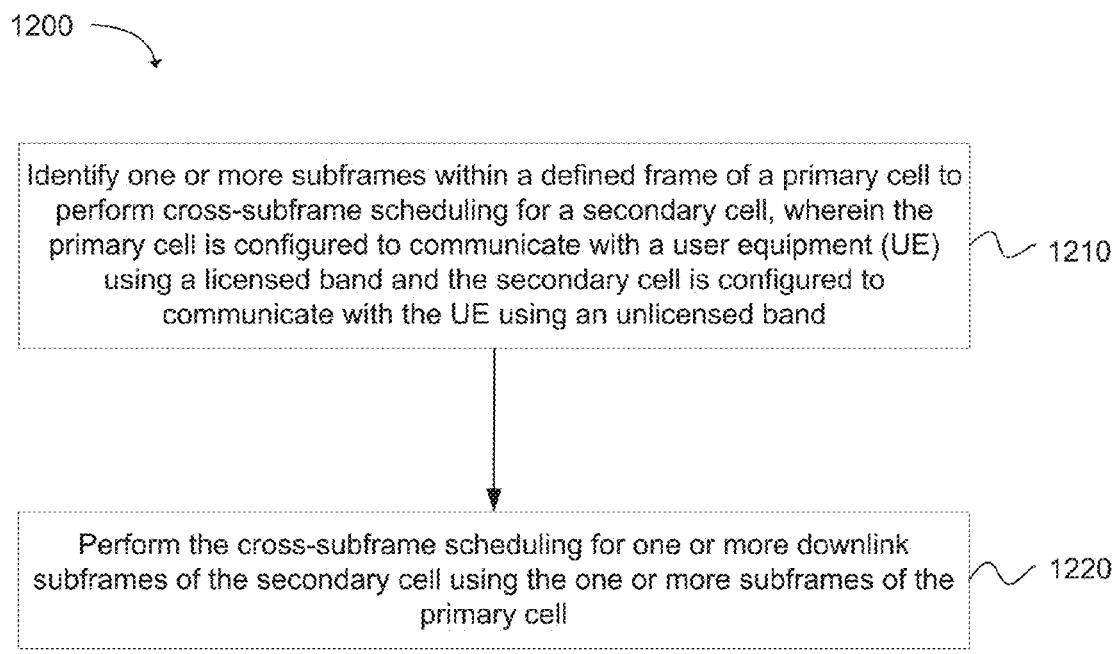
FIG. 12 depicts functionality of an evolved node B (eNB) operable to perform downlink scheduling in accordance with an example.

Another example provides functionality 1200 of an evolved node B (eNB) operable to perform downlink scheduling, as shown in the flow chart in FIG. 12. The functionality can be implemented as a method or the functionality can be executed as instructions on a machine, where the instructions are included on at least one computer readable medium or one non-transitory machine readable storage medium. The eNB can include one or more processors configured to identify one or more subframes within a defined frame of a primary cell to perform cross-subframe scheduling for a secondary cell, wherein the primary cell is configured to communicate with a user equipment (UE) using a licensed band and the secondary cell is configured to communicate with the UE using an unlicensed band, as in block 1210. The eNB can include one or more processors configured to perform the cross-subframe scheduling for one or more downlink subframes of the secondary cell using the one or more subframes of the primary cell, as in block 1220.

In one example, the one or more processors can be further configured to perform the cross-subframe scheduling for the one or more downlink subframes of the secondary cell using special subframes of the primary cell, the cross-subframe scheduling being performed in accordance with a predefined cross-subframe scheduling pattern. In another example, the one or more processors can be further configured to perform the cross-subframe scheduling for the one or more downlink subframes of the secondary cell using at least one downlink subframe of the primary cell and at least one special subframe of the primary cell.

In one example, the subframes of the primary cell are aligned with subframes of the secondary cell with respect to subframe boundaries and corresponding indexes, wherein downlink control information (DCI) is used to perform the cross-subframe scheduling for a downlink subframe of the secondary cell, wherein a subframe index of the primary cell containing the DCI is different than a subframe index of the secondary cell for which the DCI is intended. In another example, the one or more processors can be further configured to perform the cross-subframe scheduling for a defined number of consecutive downlink subframes of the secondary cell using a single subframe of the primary cell, wherein a single downlink control information (DCI) is used to perform the cross-subframe scheduling for the defined number of consecutive downlink subframes of the secondary cell.

In one example, the primary cell operates in time division duplexing (TDD) or frequency division duplexing (FDD); and the secondary cell operates in TDD or FDD. In another example, the one or more processors can be further configured to perform the cross-subframe scheduling for a downlink subframe of the secondary cell using a subframe of the primary cell that is approximately in parallel to the downlink subframe of the secondary cell, wherein the subframe of the primary cell is not aligned with the downlink subframe of the secondary cell with respect to subframe boundaries and corresponding indexes, wherein the downlink subframe of the secondary cell has a starting time instance of t1 and a finishing time instance of t2 and the subframe of the primary cell has a starting time instance of t3 and a finishing time instance of t4, wherein $t3 \leq t1$ and $t1 \leq t4 \leq t2$.

In one example, the one or more processors can be further configured to perform the cross-subframe scheduling for a defined number of consecutive downlink subframes of the secondary cell using multiple downlink control informations (DCIs) from a single subframe of the primary cell, wherein the subframes of the primary cell are not aligned with subframes of the secondary cell. In another example, a subframe indicator field is used to indicate an index of the downlink subframe of the secondary cell for which the cross-subframe scheduling is performed using downlink control information (DCI).

In one example, the one or more processors can be further configured to receive hybrid automatic repeat request (HARQ) feedback from the one or more subframes of the secondary cell, the one or more subframes of the secondary cell corresponding to one or more uplink subframes of the primary cell based on a predefined HARQ feedback pattern. In another example, the one or more processors can be further configured to receive hybrid automatic repeat request (HARQ) feedback from a subframe of the secondary cell, the subframe of the secondary cell having a transmission direction that is different than a transmission direction of a corresponding subframe of the primary cell.

In one example, the one or more processors can be further configured to receive hybrid automatic repeat request (HARQ) feedback from one or more subframes of the secondary cell that correspond with one or more uplink subframes of the primary cell, wherein the subframes of the secondary cell are not aligned with the subframes of the primary cell with respect to subframe boundaries and corresponding indexes. In another example, the one or more processors can be further configured to perform the cross-subframe scheduling for active subframes of the secondary cell and not perform the cross-subframe scheduling for dormant subframes of the secondary cell. In yet another example, the primary cell on the licensed band and the secondary cell on the unlicensed band are configured to communicate to the UE using carrier aggregation.

Figure 13:
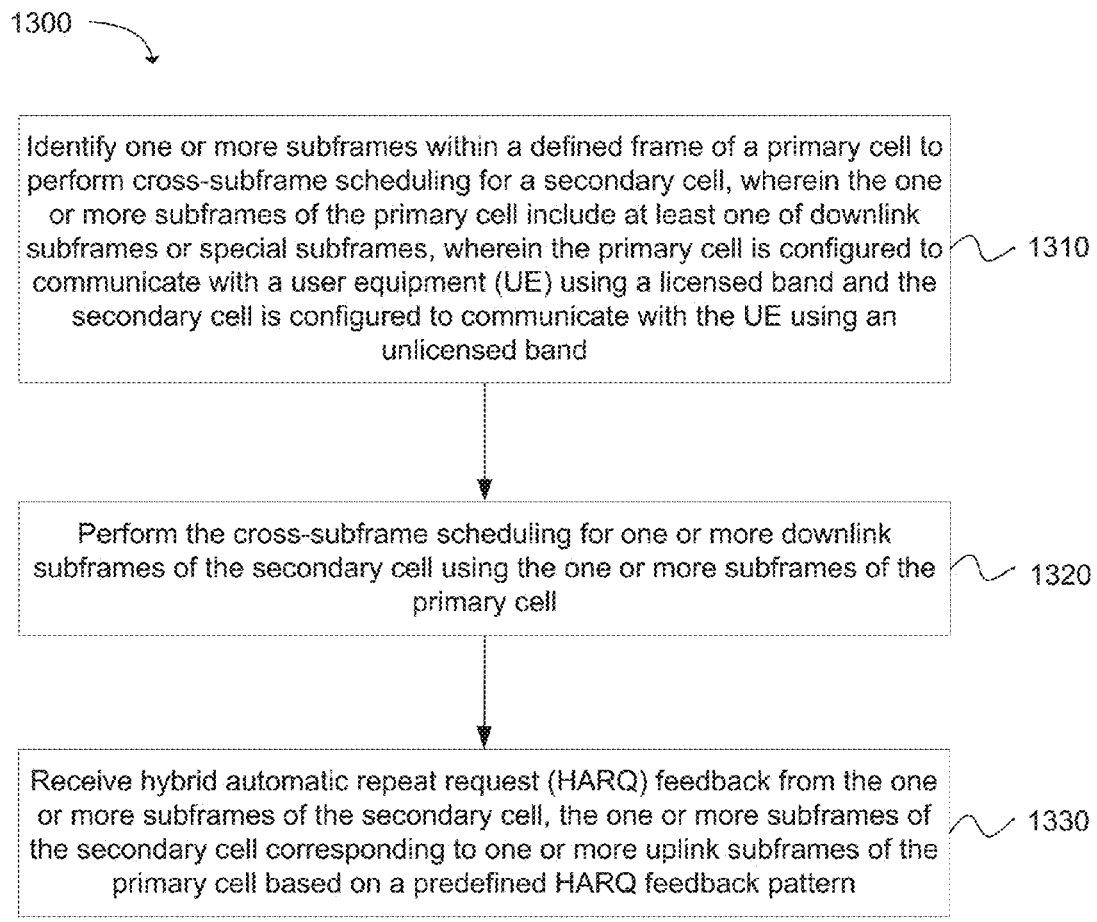
FIG. 13 depicts functionality of an evolved node B (eNB) operable to perform downlink scheduling in accordance with an example.

Another example provides functionality 1300 of an evolved node B (eNB) operable to perform downlink scheduling, as shown in the flow chart in FIG. 13. The functionality can be implemented as a method or the functionality can be executed as instructions on a machine, where the instructions are included on at least one computer readable medium or one non-transitory machine readable storage medium. The eNB can include one or more processors configured to identify one or more subframes within a defined frame of a primary cell to perform cross-subframe scheduling for a secondary cell, wherein the one or more subframes of the primary cell include at least one of downlink subframes or special subframes, wherein the primary cell is configured to communicate with a user equipment (UE) using a licensed band and the secondary cell is configured to communicate with the UE using an unlicensed band, as in block 1310. The eNB can include one or more processors configured to perform the cross-subframe scheduling for one or more downlink subframes of the secondary cell using the one or more subframes of the primary cell, as in block 1320. The eNB can include one or more processors configured to receive hybrid automatic repeat request (HARQ) feedback from the one or more subframes of the secondary cell, the one or more subframes of the secondary cell corresponding to one or more uplink subframes of the primary cell based on a predefined HARQ feedback pattern, as in block 1330.

In one example, the subframes of the primary cell are aligned with subframes of the secondary cell with respect to subframe boundaries and corresponding indexes. In another example, the subframes of the primary cell are not aligned with subframes of the secondary cell with respect to subframe boundaries and corresponding indexes, wherein the downlink subframe of the secondary cell has a starting time instance of t1 and a finishing time instance of t2 and the subframe of the primary cell has a starting time instance of t3 and a finishing time instance of t4, wherein $t3 \leq t1$ and $t1 \leq t4 \leq t2$.

In one example, the one or more processors can be further configured to perform the cross-subframe scheduling for each downlink subframe of the secondary cell using a single downlink control information (DCI). In another example, the one or more processors are further configured to perform the cross-subframe scheduling for a defined number of consecutive downlink subframes of the secondary cell using a single downlink control information (DCI).

Figure 14:
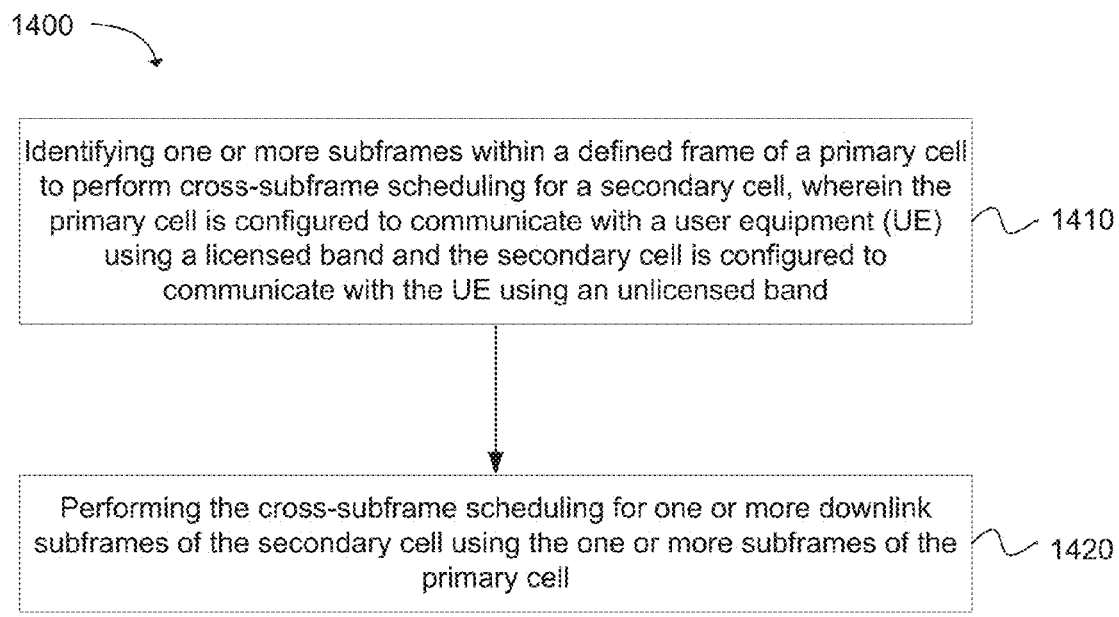
FIG. 14 depicts a flowchart of a method for performing downlink scheduling in accordance with an example.

Another example provides a method 1400 for performing downlink scheduling, as shown in the flow chart in FIG. 14. The method can be executed as instructions on a machine, where the instructions are included on at least one computer readable medium or one non-transitory machine readable storage medium. The method can include the operation of identifying one or more subframes within a defined frame of a primary cell to perform cross-subframe scheduling for a secondary cell, wherein the primary cell is configured to communicate with a user equipment (UE) using a licensed band and the secondary cell is configured to communicate with the UE using an unlicensed band, as in block 1410. The method can include the operation of performing the cross-subframe scheduling for one or more downlink subframes of the secondary cell using the one or more subframes of the primary cell, as in block 1420.

In one example, the method can further include the operation of performing the cross-subframe scheduling for the one or more downlink subframes of the secondary cell using at least one of downlink subframes of the primary cell or special subframes of the primary cell, the cross-subframe scheduling being performed in accordance with a predefined cross-subframe scheduling pattern. In another example, the method can further include the operation of performing the cross-subframe scheduling for the one or more downlink subframes of the secondary cell when the subframes of the primary cell are aligned with subframes of the secondary cell with respect to subframe boundaries and corresponding indexes.

In one example, the method can further include the operation of performing the cross-subframe scheduling for the downlink subframe of the secondary cell using downlink control information (DCI), wherein a subframe index of the primary cell containing the DCI is different than a subframe index of the secondary cell for which the DCI is intended; or performing the cross-subframe scheduling for a defined number of consecutive downlink subframes of the secondary cell using multiple downlink control informations (DCIs) from a single downlink subframe of the primary cell. In another example, the method can include the operation of receiving hybrid automatic repeat request (HARQ) feedback from the one or more subframes of the secondary cell, the one or more subframes of the secondary cell corresponding to one or more uplink subframes of the primary cell based on a predefined HARQ feedback pattern.

Figure 15:
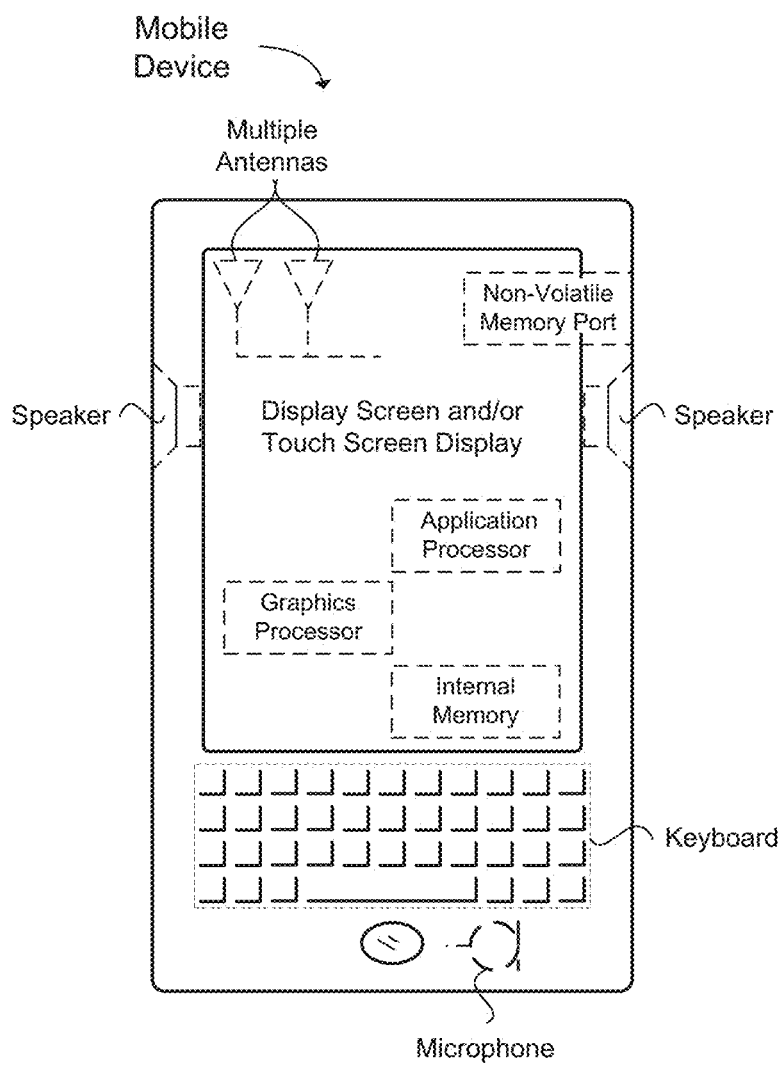
FIG. 15 illustrates a diagram of a wireless device (e.g., UE) in accordance with an example.

FIG. 15 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base stations (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An evolved node B (eNB) operable to perform downlink scheduling, the eNB having one or more processors configured to:
    identify one or more subframes within a defined frame of a primary cell to perform cross-subframe scheduling for a secondary cell, wherein the primary cell is configured to communicate with a user equipment (UE) using a licensed band and the secondary cell is configured to communicate with the UE using an unlicensed band; and
    perform the cross-subframe scheduling for one or more downlink subframes of the secondary cell using the one or more subframes of the primary cell; and
    perform the cross-subframe scheduling for a downlink subframe of the secondary cell using a subframe of the primary cell that is approximately in parallel to the downlink subframe of the secondary cell, wherein the subframe of the primary cell is not aligned with the downlink subframe of the secondary cell with respect to subframe boundaries and corresponding indexes, wherein the downlink subframe of the secondary cell has a starting time instance of $t_1$ and a finishing time instance of $t_2$ and the subframe of the primary cell has a starting time instance of $t_3$ and a finishing time instance of $t_4$, wherein $t_3 \leq t_1$ and $t_1 \leq t_4 \leq t_2$.

2. The eNB of claim 1, wherein the one or more processors are further configured to perform the cross-subframe scheduling for the one or more downlink subframes of the secondary cell using special subframes of the primary cell, the cross-subframe scheduling being performed in accordance with a predefined cross-subframe scheduling pattern.

3. The eNB of claim 1, wherein the one or more processors are further configured to perform the cross-subframe scheduling for the one or more downlink subframes of the secondary cell using at least one downlink subframe of the primary cell and at least one special subframe of the primary cell.

4. The eNB of claim 1, wherein the subframes of the primary cell are aligned with subframes of the secondary cell with respect to subframe boundaries and corresponding indexes, wherein downlink control information (DCI) is used to perform the cross-subframe scheduling for a downlink subframe of the secondary cell, wherein a subframe index of the primary cell containing the DCI is different than a subframe index of the secondary cell for which the DCI is intended.

5. The eNB of claim 1, wherein the one or more processors are further configured to perform the cross-subframe scheduling for a defined number of consecutive downlink subframes of the secondary cell using a single subframe of the primary cell, wherein a single downlink control information (DCI) is used to perform the cross-subframe scheduling for the defined number of consecutive downlink subframes of the secondary cell.

6. The eNB of claim 1, wherein:
the primary cell operates in time division duplexing (TDD) or frequency division duplexing (FDD); and
the secondary cell operates in TDD or FDD.

7. The eNB of claim 1, wherein the one or more processors are further configured to perform the cross-subframe scheduling for a defined number of consecutive downlink subframes of the secondary cell using multiple downlink control informations (DCIs) from a single subframe of the primary cell, wherein the subframes of the primary cell are not aligned with subframes of the secondary cell.

8. The eNB of claim 1, wherein a subframe indicator field is used to indicate an index of the downlink subframe of the secondary cell for which the cross-subframe scheduling is performed using downlink control information (DCI).

9. The eNB of claim 1, wherein the one or more processors are further configured to receive hybrid automatic repeat request (HARQ) feedback from the one or more subframes of the secondary cell, the one or more subframes of the secondary cell corresponding to one or more uplink subframes of the primary cell based on a predefined HARQ feedback pattern.

10. The eNB of claim 1, wherein the one or more processors are further configured to receive hybrid automatic repeat request (HARQ) feedback from a subframe of the secondary cell, the subframe of the secondary cell having a transmission direction that is different than a transmission direction of a corresponding subframe of the primary cell.

11. The eNB of claim 1, wherein the one or more processors are further configured to receive hybrid automatic repeat request (HARQ) feedback from one or more subframes of the secondary cell that correspond with one or more uplink subframes of the primary cell, wherein the subframes of the secondary cell are not aligned with the subframes of the primary cell with respect to subframe boundaries and corresponding indexes.

12. The eNB of claim 1, wherein the one or more processors are further configured to perform the cross-subframe scheduling for active subframes of the secondary cell and not perform the cross-subframe scheduling for dormant subframes of the secondary cell.

13. The eNB of claim 1, wherein the primary cell on the licensed band and the secondary cell on the unlicensed band are configured to communicate to the UE using carrier aggregation.

14. An evolved node B (eNB) operable to perform downlink scheduling, the eNB having one or more processors configured to:
identify one or more subframes within a defined frame of a primary cell to perform cross-subframe scheduling for a secondary cell, wherein the one or more subframes of the primary cell include at least one of downlink subframes or special subframes, wherein the primary cell is configured to communicate with a user equipment (UE) using a licensed band and the secondary cell is configured to communicate with the UE using an unlicensed band;
perform the cross-subframe scheduling for one or more downlink subframes of the secondary cell using the one or more subframes of the primary cell; and
receive hybrid automatic repeat request (HARQ) feedback from the one or more subframes of the secondary cell, the one or more subframes of the secondary cell corresponding to one or more uplink subframes of the primary cell based on a predefined HARQ feedback pattern; and
wherein the subframes of the primary cell are not aligned with subframes of the secondary cell with respect to subframe boundaries and corresponding indexes, wherein the downlink subframe of the secondary cell has a starting time instance of $t_1$ and a finishing time instance of $t_2$ and the subframe of the primary cell has a starting time instance of $t_3$ and a finishing time instance of $t_4$, wherein $t_3 \leq t_1$ and $t_1 \leq t_4 \leq t_2$.

15. The eNB of claim 14, wherein the subframes of the primary cell are aligned with subframes of the secondary cell with respect to subframe boundaries and corresponding indexes.

16. The eNB of claim 14, wherein the one or more processors are further configured to perform the cross-subframe scheduling for each downlink subframe of the secondary cell using a single downlink control information (DCI).

17. The eNB of claim 14, wherein the one or more processors are further configured to perform the cross-subframe scheduling for a defined number of consecutive downlink subframes of the secondary cell using a single downlink control information (DCI).

18. A method for performing downlink scheduling, the method comprising:
identifying one or more subframes within a defined frame of a primary cell to perform cross-subframe scheduling for a secondary cell, wherein the primary cell is configured to communicate with a user equipment (UE) using a licensed band and the secondary cell is configured to communicate with the UE using an unlicensed band; and
performing the cross-subframe scheduling for one or more downlink subframes of the secondary cell using the one or more subframes of the primary cell; and
wherein the subframes of the primary cell are not aligned with subframes of the secondary cell with respect to subframe boundaries and corresponding indexes, wherein the downlink subframe of the secondary cell has a starting time instance of $t_1$ and a finishing time instance of $t_2$ and the subframe of the primary cell has a starting time instance of $t_3$ and a finishing time instance of $t_4$, wherein $t_3 \leq t_1$ and $t_1 \leq t_4 \leq t_2$.

19. The method of claim 18, further comprising performing the cross-subframe scheduling for the one or more downlink subframes of the secondary cell using at least one of downlink subframes of the primary cell or special subframes of the primary cell, the cross-subframe scheduling being performed in accordance with a predefined cross-subframe scheduling pattern.

20. The method of claim 18, further comprising performing the cross-subframe scheduling for the one or more downlink subframes of the secondary cell when the subframes of the primary cell are aligned with subframes of the secondary cell with respect to subframe boundaries and corresponding indexes.

21. The method of claim 18, further comprising:
performing the cross-subframe scheduling for the downlink subframe of the secondary cell using downlink control information (DCI), wherein a subframe index of the primary cell containing the DCI is different than a subframe index of the secondary cell for which the DCI is intended; or
performing the cross-subframe scheduling for a defined number of consecutive downlink subframes of the secondary cell using multiple downlink control informations (DCIs) from a single downlink subframe of the primary cell.

22. The method of claim 18, further comprising receiving hybrid automatic repeat request (HARQ) feedback from the one or more subframes of the secondary cell, the one or more subframes of the secondary cell corresponding to one or more uplink subframes of the primary cell based on a predefined HARQ feedback pattern.

\* \* \* \* \*